US011003875B2

(12) United States Patent
Dorado et al.

(10) Patent No.: US 11,003,875 B2
(45) Date of Patent: May 11, 2021

(54) HANDHELD ID-READING SYSTEM WITH INTEGRATED ILLUMINATION ASSEMBLY

(71) Applicant: Cognex Corporation, Natick, MA (US)

(72) Inventors: Jose Fernandez Dorado, Aachen (DE); Laurens Nunnink, Simpleveld (NL); Saul Sanz Rodriguez, Aachen (DE); Kai Fluegge, Aachen (DE); Yasin Salih Ciftci, Aachen (DE)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/177,791

(22) Filed: Nov. 1, 2018

(65) Prior Publication Data
US 2020/0143129 A1 May 7, 2020

(51) Int. Cl.
*G06K 7/10* (2006.01)
*H04N 5/225* (2006.01)
*F21K 9/60* (2016.01)
*G02F 1/1335* (2006.01)

(52) U.S. Cl.
CPC ....... *G06K 7/10881* (2013.01); *H04N 5/2254* (2013.01); *F21K 9/60* (2016.08); *G02F 1/133509* (2013.01)

(58) Field of Classification Search
CPC ........ G06K 19/00; G06Q 20/20; G06Q 20/34; G06Q 20/40
USPC ........................................ 235/380, 375, 487
See application file for complete search history.

(56) References Cited

U.S. PATENT DOCUMENTS

| 7,835,554 | B2 | 11/2010 | Rowe | |
|---|---|---|---|---|
| 8,224,174 | B2 | 7/2012 | Pastore | |
| 9,158,155 | B2 | 10/2015 | Weber | |
| 9,811,701 | B2 | 11/2017 | Powell | |
| 9,830,487 | B2 | 11/2017 | Powell | |
| 9,858,460 | B2 | 1/2018 | Hoobler | |
| 9,858,461 | B2 | 1/2018 | Utykanski | |
| 9,911,022 | B2 | 3/2018 | Utykanski | |
| 10,113,910 | B2 | 10/2018 | Brunk | |
| 10,498,941 | B2 | 12/2019 | Rhoads | |
| 10,699,085 | B2 | 6/2020 | Utykanski | |
| 10,853,598 | B2 | 12/2020 | Powell | |
| 2006/0032921 | A1* | 2/2006 | Gerst, III | ........... G06K 7/10851 235/455 |

(Continued)

*Primary Examiner* — Edwyn Labaze
(74) *Attorney, Agent, or Firm* — Loginov & Associates, PLLC; William A. Loginov

(57) ABSTRACT

This provides an ID reader, typically configured for handheld operation, which integrates three types of illumination into a compact package that generates robust performance and resistance to harsh environmental conditions, such as dust and moisture. These illumination types include, direct (diffuse) light, low-angle light and polarized light. The ID reader includes a sealed reader module assembly having the illuminators in combination with an imager assembly (optics and image sensor) at its relative center. Additionally, also an on-axis aimer and a variable focus system with liquid lens have been integrated in this module and is placed on axis using a mirror assembly that includes a dichroic filter. As the optimal distance to read a code with low-angle light is typically shorter than the optimal distance to use the polarized illumination a variable (e.g. liquid) lens can adjust the focus of the reader to the optimal distance for the selected illumination.

25 Claims, 15 Drawing Sheets

(56) References Cited

U.S. PATENT DOCUMENTS

| | | | |
|---|---|---|---|
| 2006/0131419 A1* | 6/2006 | Nunnink | G06K 7/10732 235/472.02 |
| 2013/0053701 A1* | 2/2013 | Wiest | A61B 5/0059 600/476 |
| 2014/0211071 A1* | 7/2014 | Pawlik | G07D 7/12 348/335 |
| 2015/0220766 A1* | 8/2015 | Russell | G06K 7/10881 235/462.42 |
| 2015/0317503 A1 | 11/2015 | Powell | |
| 2016/0321485 A1 | 11/2016 | Utykanski | |
| 2017/0140187 A1 | 5/2017 | Izaki | |
| 2019/0228197 A1 | 7/2019 | Russell | |

* cited by examiner

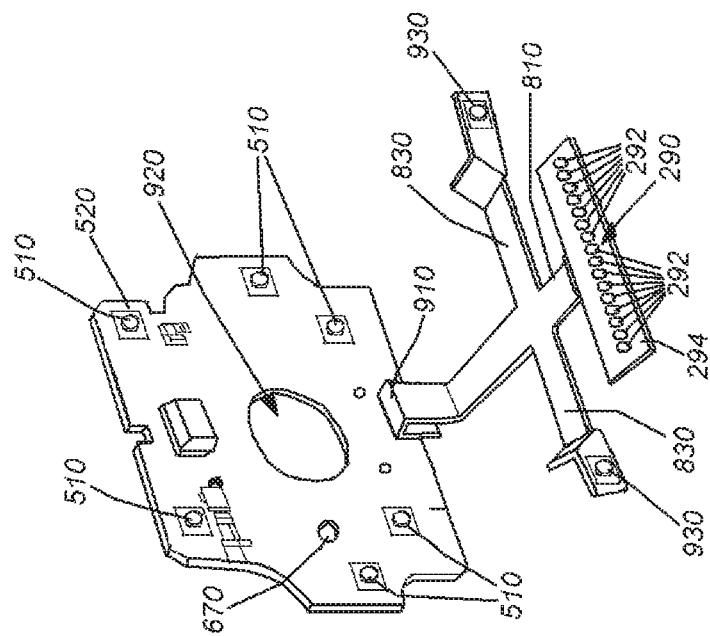
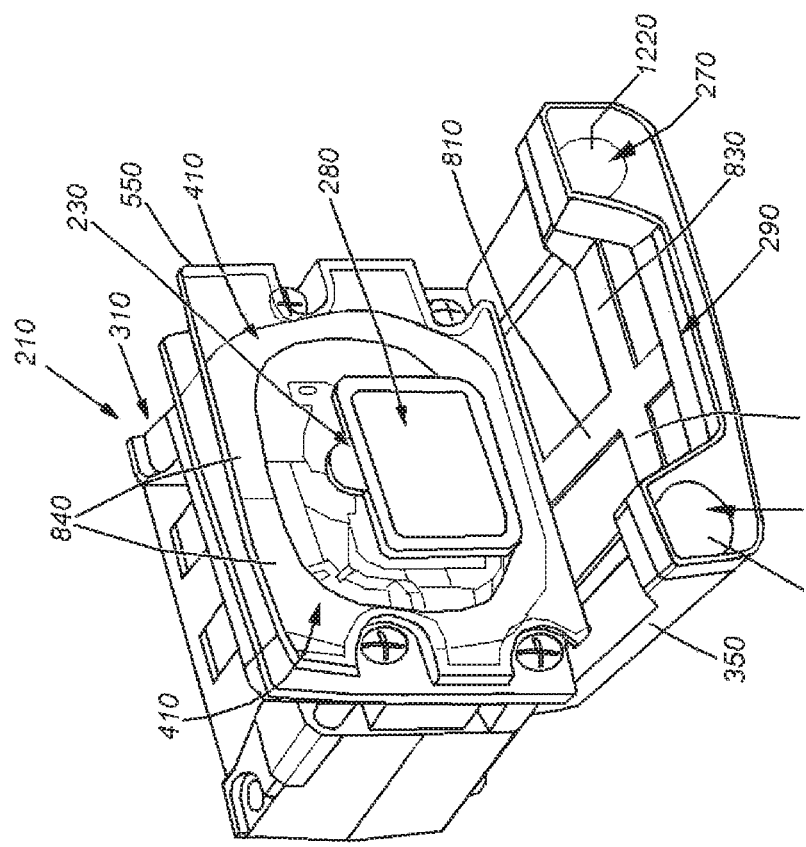

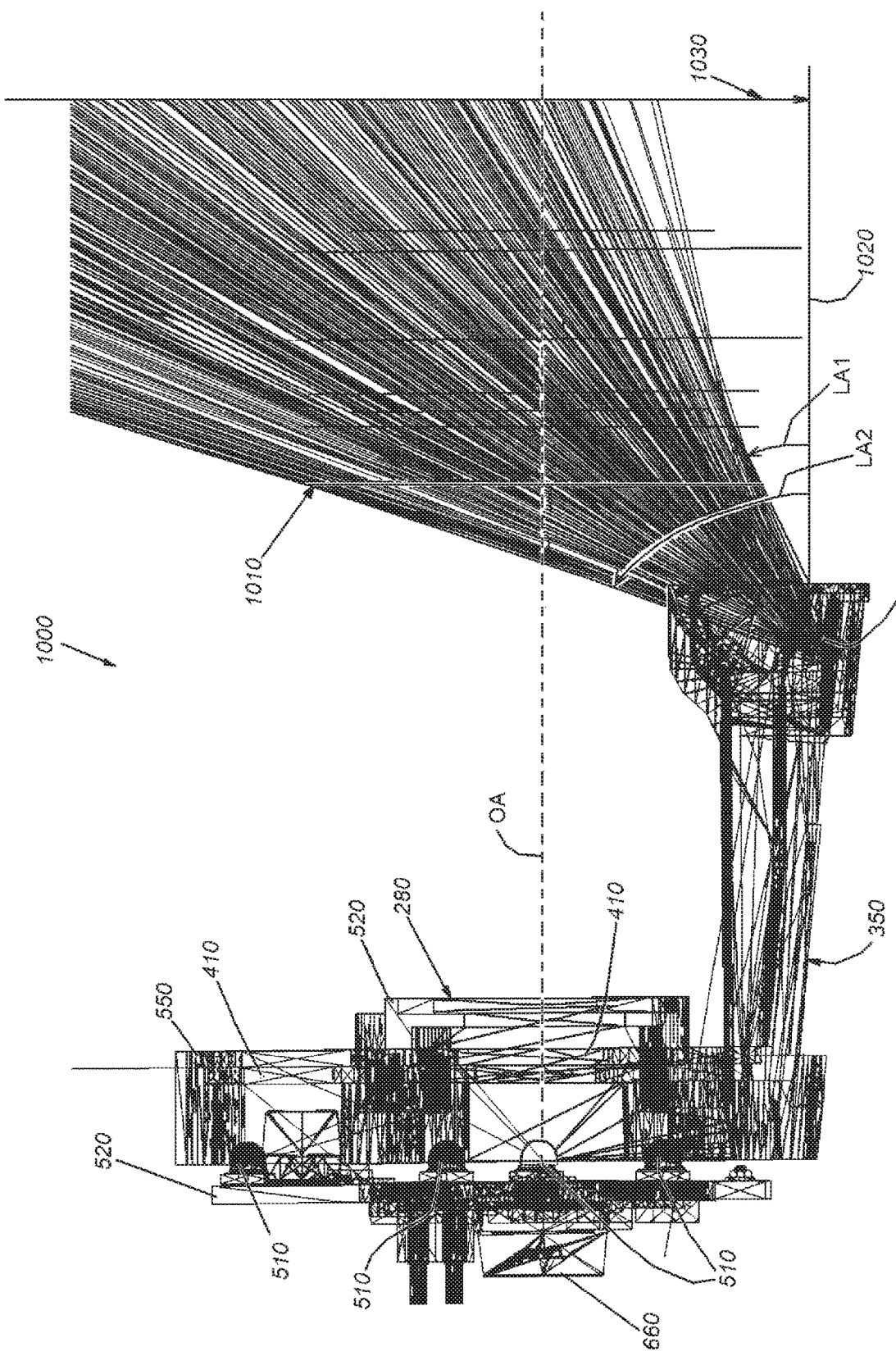

HANDHELD ID-READING SYSTEM WITH INTEGRATED ILLUMINATION ASSEMBLY

FIELD OF THE INVENTION

This invention relates to machine vision systems for use in finding and decoding ID codes on objects, and more particularly to cameras and associated illuminators for such vision systems.

BACKGROUND OF THE INVENTION

Vision systems that perform measurement, inspection, alignment of objects and/or decoding of symbology in the form of machine-readable symbols (also termed "ID codes", "barcodes" or sometimes, simply "IDs", such as a one-dimensional (1D) barcode, two-dimensional (2D) DataMatrix code, QR code or DPM code) are used in a wide range of applications and industries. These systems are based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of an ID reader (also termed herein, a "camera"), the user or automated process acquires an image of an object that is believed to contain one or more barcodes. The image is processed to identify barcode features, which are then decoded by a decoding process and/or processor obtain the inherent alphanumeric data represented by the code.

In operation, an ID reader typically functions to illuminate the scene containing one or more ID codes. The illuminated scene is then acquired by an image sensor within the imaging system through optics. The array sensor pixels is exposed, and the electronic value(s) generated for each pixel by the exposure is/are stored in an array of memory cells that can be termed the "image" of the scene. In the context of an ID-reading application, the scene includes an object of interest that has one or more IDs of appropriate dimensions and type. The ID code(s) are part of the stored image.

A common use for ID readers is to track and sort objects moving along a line (e.g. a conveyor) in manufacturing and logistics operations. The ID reader, or more typically, a plurality (constellation) of readers, can be positioned over the line at an appropriate viewing angle(s) to acquire any expected ID codes on the face(s) of respective objects as they each move through the field of view. The ID reader can also be provided in a handheld configuration that allows the user to move from object to object—for example on an inspection floor and vary the distance and/or relative angle between the reader and object surface at will More generally, the focal distance of the ID reader with respect to the object can vary, depending on the placement of the reader with respect to the line and the size of the object.

It is often challenging to find and decode small-scale ID codes—for example printed, peened or etched DataMatrix codes provided on parts, in addition to other forms of printed-label codes. One particular implementation of such small ID codes is the direct part marking or DPM code, used widely in manufacturing environments. Such DPM codes can occur in a variety of objects and parts, such as electronic and optoelectronic components used (e.g.) in display panels, solar panels, circuit boards, etc. By way of example, a DPM can be defined as one whose cell or bar dimensions are less than approximately 5 Mil. Such small feature dimensions generally require the ID reader optics to exhibit good depth of focus/field (DOF), and relatively good focus over a given range. Additionally, since such IDs may be applied directly to a variety of surface finished and/or textures a single form of illumination—often direct, diffuse illumination is not always the optimal illumination pattern to resolve applied ID features. Many ID readers, thus, include additional forms of illumination, such as a low-angle light projector. Integration of multiple types of illumination into a relatively compact and user-friendly handheld ID reader is challenging. Likewise, it is common for direct (diffuse) illumination assemblies that often surround the imager optics to cause a so-called "shadow" effect, in which the region in the center of the illuminated object surface appears darkened due to the lack of projected light in the center of the light pattern.

SUMMARY OF THE INVENTION

This invention overcomes disadvantages of the prior art by providing an ID reader, typically configured for handheld operation, that integrates three types of illumination into a compact package that generates robust performance and resistance to harsh environmental conditions, such as dust and moisture. These illumination types include, direct (diffuse) light, low-angle light and polarized light. The ID reader includes a sealed reader module assembly having the illuminators in combination with an imager assembly (optics and image sensor) at its relative center. Additionally, also an on-axis aimer and a variable focus system with liquid lens have been integrated in this module and is placed on axis using a mirror assembly that includes a dichroic filter. As the optimal distance to read a code with low-angle light is typically shorter than the optimal distance to use the polarized illumination a variable (e.g. liquid) lens can adjust the focus of the reader to the optimal distance for the selected illumination.

Advantageously, the illustrative embodiment(s) herein integrate the three discrete types of illumination in combination with a variable (e.g. liquid) lens and an on-axis aimer in a volume that is compact enough to be used in the operational module (head) of handheld ID reader. The compactness of the illustrative ID reader module is influenced by a plurality of design features. One feature is a low-angle light assembly that generates a single line of LEDs covered by (e.g.) an oval (or other configuration holographic diffuser positioned in front of these LEDs, to render the light more uniform. Additionally, beam-shaping optics are employed in conjunction with a back-illuminated diffuser, which can be part of a protective cover/window that seals the front of the module. A thin flexible printed circuit board (PCB) extends from the main illumination circuit board, located behind the cover/window is used to position the LEDs for the low-angle illumination and polarized illumination close to the front of the module.

In an illustrative embodiment, a system and method for capturing images from one or more ID codes directly marked onto an object is provided. The system and method employs a module having, (a) an image sensor assembly that transmits data relative to the images to a vision system processor, (b) a diffuse illumination assembly, (c) a low-angle illumination assembly, and (d) a polarized illumination assembly. A polarizing filter is mounted between the object and the image sensor assembly in which a polarization direction of the filter is approximately perpendicular to a polarization direction of the illumination. Illustratively, the low-angle illumination assembly defines a plurality of discrete light sources arranged approximately in a line, and further comprises a holographic diffuser between the light sources and the object, wherein the holographic diffuser defines diffusivity approximately along a line greater than diffusivity perpendicular to a line. The plurality of discrete light sources can comprise a plurality of LEDs, and/or the polarized illumination assembly can comprise at least two light sources, in which the (at least) two light sources project polarized light in a substantially similar polarization direction, located on each of opposing sides of the low-angle illumination assembly. The (at least) two light sources can comprise at least two LEDs. Additionally, a respective polarizing filter can be located in front of each of the (at least) two LEDs. A lens assembly can also be provided, and is associated with the respective polarizing filter. It is constructed and arranged with a tilt so that polarized light from the (at least) two LEDs is directed to cross an optical axis of the image sensor assembly approximately at a predetermined working distance. Illustratively, the low angle illumination assembly and the polarizing illumination assembly are mounted adjacent to a front end of a forward extension that extends forwardly beyond light sources of the diffuse illumination assembly. The diffuse illumination assembly can define a plurality of light sources on an illumination circuit board located behind a diffuser that surrounds optics of the image sensor assembly. Additionally, beam-shaping optics can be provided to spread light projected by the light sources on the illumination circuit board. The beam-shaping optics can confront a protective, light-transmitting cover that seals an interior of a housing of the module. The beam-shaping optics can be constructed and arranged to allow light to enter a central region of the diffuser so as to reduce a shadow effect. The protective cover can also have a window located in front of the image sensor assembly, along an optical axis thereof, which carries the polarizing filter. The optics of the image sensor assembly can have a liquid lens that adjusts a focus distance of the image sensor assembly. Control circuitry can be provided, which adjusts the focus distance based upon one or more types of illumination (b), (c) and (d) being projected by the module. The focus distance associated the illumination (b) can be located more adjacent to the image sensor and the focus distance associated with the illuminations (c) and (d) can be located at a further spacing from the image sensor. Illustratively, the further spacing is approximately 30 millimeters with respect to illumination (b). An aimer assembly can be provided, which projects an aimer beam from a light source located behind the illumination circuit board onto a mirror assembly that (then) redirects the aimer beam onto an optical axis of the image sensor assembly. The aimer beam can be projected through a collimating lens, and the mirror assembly can have a redirecting mirror that receives the aimer beam from the collimating lens. Also, a dichroic mirror is arranged on the optical axis that receives the aimer beam from the redirecting mirror and reflects the aimer beam onto the optical axis. Illustratively, the diffuse illumination defines a first wavelength range that passes through the dichroic mirror and the aimer beam defines a second wavelength range that is reflected by the dichroic mirror. A wavelength range of the illuminations (b), (c) and (d) can differ from the wavelength range of the aimer beam, and the dichroic mirror can reflect the wavelength of the aimer beam and transmit the wavelength of each of the different illuminations. In exemplary implementations, the module is mounted on a handheld ID reader housing. Illustratively, the light sources of the illuminations (c) and (d) are mounted on a flexible printed circuit board, and the flexible printed circuit board is connected with a rigid printed circuit board on which the light sources of the illumination (b) are mounted. Illustratively, light sources of the illumination (b) are located behind a translucent diffuser, which is located surrounding, and in front of, the image sensor. The diffuser defines an approximately conical shape that is substantially free of step changes in a curvature and substantially free of variation in a wall thickness along the approximately conical shape thereof.

In another exemplary embodiment, an ID reader, typically configured for handheld operation, is provided that integrates three types of illumination into a compact package that generates robust performance and resistance to harsh environmental conditions, such as dust and moisture. These illumination types include, direct (diffuse) light, low-angle light and polarized light. The ID reader includes a sealed reader module assembly having the illuminators in combination with an imager assembly (optics and image sensor) at its relative center. Additionally, also an on-axis aimer and a variable focus system with liquid lens have been integrated in this module and is placed on axis using a mirror assembly that includes a dichroic filter. As the optimal distance to read a code with low-angle light is typically shorter than the optimal distance to use the polarized illumination a variable (e.g. liquid) lens can adjust the focus of the reader to the optimal distance for the selected illumination.

BRIEF DESCRIPTION OF THE DRAWINGS

The invention description below refers to the accompanying drawings, of which:

FIG. 8 is an exposed perspective view of the ID reader module according to the embodiment of FIG. 7, showing the placement of the flexible printed circuit board within the forward extension for interconnecting the main illumination circuit board to the polarized illumination LEDs and low-angle light LED assembly;

FIG. 9 is a perspective view of the main illumination circuit board and interconnected flexible circuit board and illumination LEDs of FIG. 8;

FIG. 10 is a partial side cross section of the ID reader module of FIG. 2, showing a ray diagram with the relative working angles of light projected by the low-angle light assembly;

DETAILED DESCRIPTION

I. System Overview and Illumination Types

Figure 1:
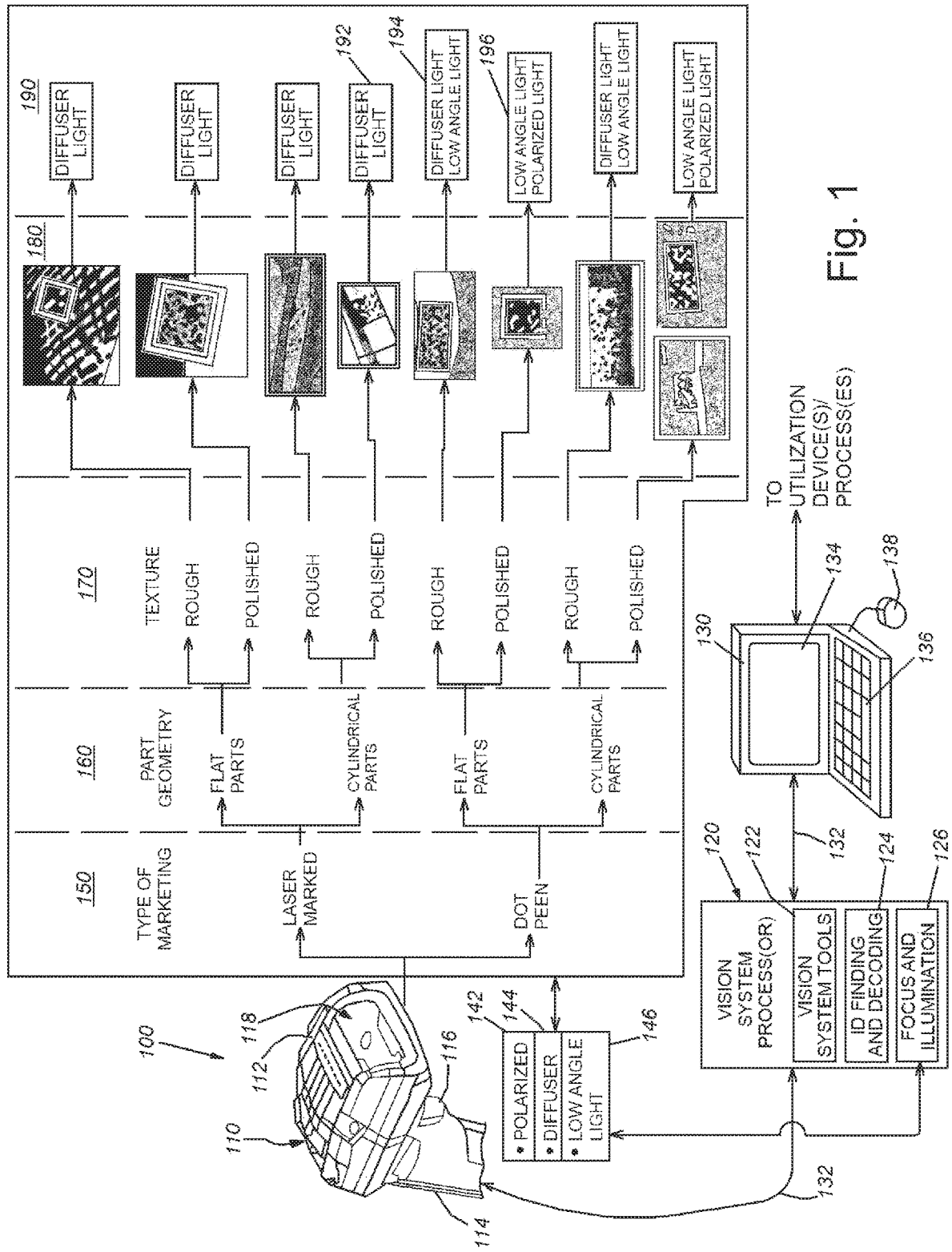
FIG. 1 is diagram showing an exemplary handheld ID reader with a vision system processor and an integrated illumination assembly for projecting plurality of associated illumination types, in which various types are used individually or in combination to illuminate differing ID code and substrate surface arrangements.
Figure 2:
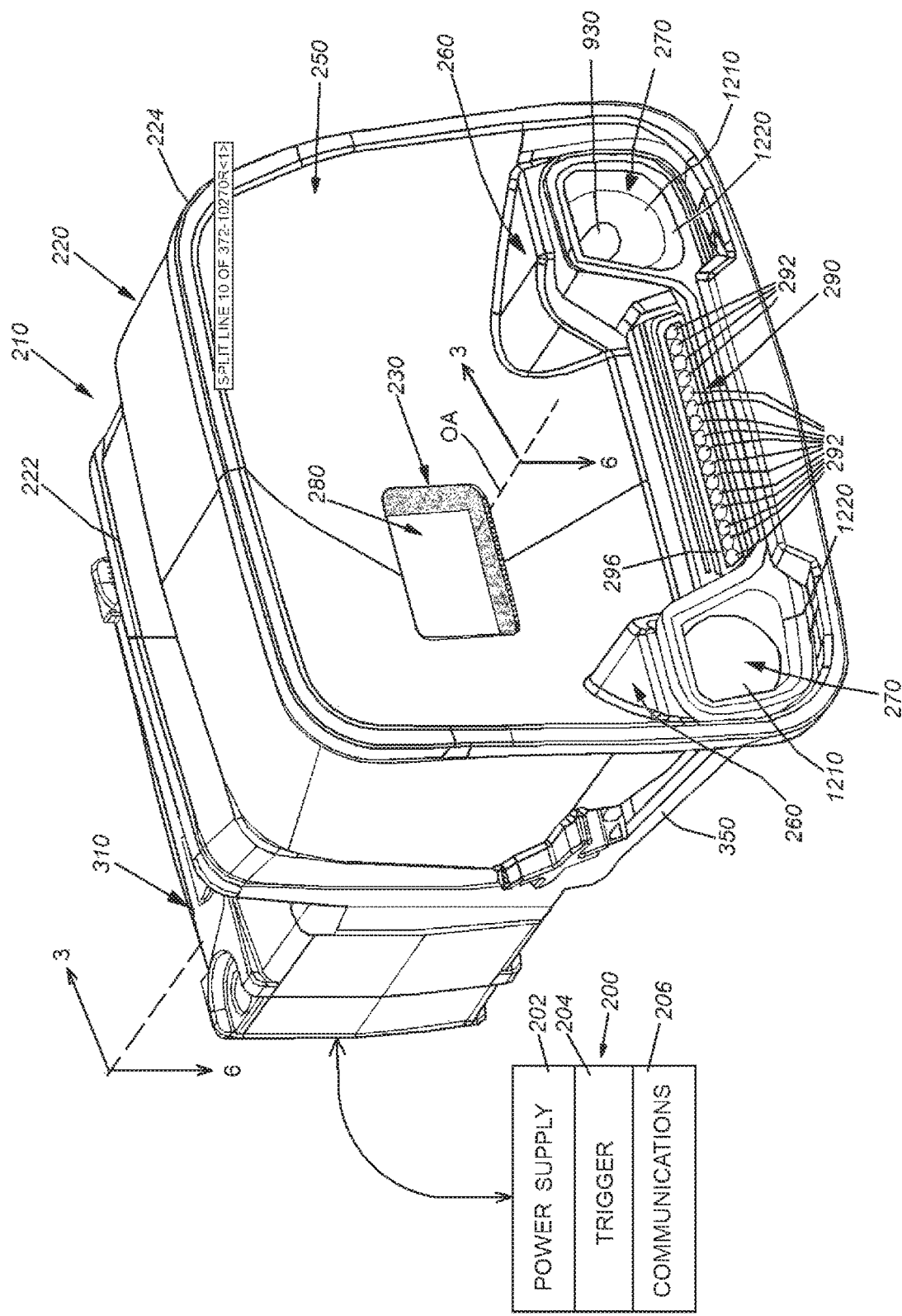
FIG. 2 is a perspective view of a reader module for use in a handheld ID reader, such as the exemplary reader of FIG. 1, according to an illustrative embodiment.

FIG. 1 shows a vision system arrangement 100 that is adapted to capture images and decode features with respect to a shiny (i.e. reflective) or textured, and rounded or flat, surface according to an exemplary embodiment. The system 100 includes an exemplary vision system camera assembly (in the form of a handheld ID reader 110 with imaging/reading module 112, grip 114 and trigger assembly 116. The reader module 112 (described in detail, below) includes a (e.g. two-dimensional (2D)) image sensor (also termed an "imager" or simply a "sensor") and associated lens optics. The optics is surrounded by an illumination assembly 118, also described in detail below. The vision system camera assembly 110 transmits captured images to a vision system process(or) 120 that can be instantiated within the housing/body of the camera assembly (110) entirely, or partially/fully located remote from the camera assembly—for example in a general-purpose computing device 130, such as a PC, server, laptop, tablet or handheld device (e.g. smartphone). Such computing device 130 can also be intermittently connected via an appropriate (e.g. wired or wireless) network link 132 for setup and/or runtime control and data acquisition. Such a computing device 130 can also include and appropriate user interface, including a display and/or touchscreen 134, keyboard 136 and mouse 138. Acquired data (e.g. decoded IDs) is transferred from the processor 120 and/or the device 130 to a utilization device or process(or), that can include tracking and/or logistics software or other data-handling/storage applications.

The vision system process(or) 120 can include various functional processor and associated processes or modules. By way of non-limiting example, such processes/modules can include a plurality of vision tools 122, including edge-finders, blob analyzers, calipers, pattern recognition tools, etc. Vision system tools are commercially available from a variety of vendors, such as Cognex Corporation, of Natick, Mass. The process(or) 120 can also include an ID (or other feature) finder and decoder 124, that uses information retrieved by the vision tools from acquired images to locate ID code candidates (e.g. DPM codes), and decode successfully identified candidates to extract alphanumeric (and other) information. Note that DPM codes (and other similar types) are available in wide range of types, sizes and configurations, most or all of which can be effectively imaged and decoded using the system and method herein. The processor can also include various camera control processor and associated processes/modules, including a focus, trigger and illumination process(or) 126. This is used to control image acquisition and operation of the illumination system that projects appropriate light onto the surface of an imaged object.

The illumination assembly 118 is herein adapted to properly and effectively illuminate a wide range of object geometries and surface textures in an effort to find and decode applied ID codes. As shown, the illumination process(or) 126 can operate and/or activate at least three different types of illumination including cross-polarized light 142. That is, the image sensor's optics includes a polarizer that is cross-polarized (perpendicular) with respect to a polarizer provided to the transmitted light), diffuse light (i.e. generally directly projected/on-optical-axis light that passes through a diffusive filter) 144 and/or low-angle light 146 (i.e. light that is directed onto the object surface at a significant non-perpendicular angle so as to accentuate small variations in surface height). These discrete/differing illuminators can be operated during an image acquisition individually, separately (each within a sequence of image frames), or collectively (with two or more illuminators operating concurrently). As such, FIG. 1 depicts how the three types of illuminations 142, 144 and 146 can be used to illuminate differently marked ID codes on different surface shapes and/or textures. As shown, the exemplary marking types (column 150) can be either laser marked (etched) or dot peened. The object surface geometry/shape (column 160) can be either relatively flat or curved (e.g. cylindrical, but also semi-spherical, etc.). The surface texture (column 170) can define a polished (e.g. specular) or rough (e.g. rough/textured) finish. Resultant images (column) 180 can be produced of substantially readable ID code(s) for a given marking type (150), geometry (160) and texture (170) using the indicated illumination or combination of illuminations in column 190. By way of example, a polished, cylindrical surface with a laser etched ID code is desirable illuminated using only diffuse (direct) light (block 192). In another example, a dot-peened ID code is desirably illuminated on a rough-texture, substantially flat surface using diffuse light in combination with low-angle light (block 194). The same arrangement, but with a polished surface, is desirably illuminated using low-angle light in combination with polarized light (block 196).

II. General Construction and Illumination Assemblies

Reference is made variously to FIGS. 2-9, which depict the internal assembly 210 for the ID reader module 112 of the handheld reader 110. The assembly 210 consists of a base 310 containing the control electronics, power distribution and image processing components (e.g. a microprocessor, FPGA, etc.) 312. These components are interconnected to an image sensor (also termed an "imager" or simply a "sensor") 314 (FIG. 3), which can be based on CMOS technology or another equivalent architecture. The sensor 314 defines a two-dimensional 2D (N×M) array of pixels in this embodiment. The pixels array of the sensor 314 can be generally rectangular and any appropriate size/resolution. The pixels can be arranged to sense grayscale levels of received light or color values/intensities. The base 310 contains a lens assembly (optics) 320 that can be configured within a threaded barrel 322 for mounting within a corresponding threaded lens mount 324. The lens mount 324 and barrel 322 can be configured as a conventional C-mount—or another standard or custom mounting base standard. The optics 320 or base 310 can include a variable lens (e.g. a liquid lens, such as those available from Varioptic of France or Optotune of Switzerland) 330, which can be secured using a clip 332, 334 or other assembly, to the base 310. Alternatively, an electro-mechanical variable lens, according to a conventional or custom design can be employed, or a fixed lens assembly that allows for an appropriate working range can be employed. The focal distance (diopter value) of the variable lens 330 can be controlled by the processing components 312, and is adjusted based upon appropriate feedback from the image sensor and vision system, as well as any additional distance sensors—for example, integrated or separate time-of-flight sensors. Appropriate cables and/or contacts can be used to interconnect the variable lens 312 to one or more circuit boards within the base 310. The clip assembly 332, 334 can also contain an optical filter 336 between the variable lens 330 and the optics 320. This filter 336 can comprise a conventional or customized polarizing filter. The base is interconnected to an illumination assembly 220 that resides at the front end of the overall ID reader module 210. The illumination assembly 220 comprises a rear member 222 that is attached to the base 310 using (e.g.) one or more threaded fasteners 340. The front member 224 comprises a diffuser assembly described further below. The rear member 222 includes a circuit board arrangement that carries a plurality of illumination sources (e.g. high output LEDs), which project various types of illumination through filters, lenses and diffusers carried generally in the front member 224. The front member 222 includes a forward extension 350 at the bottom side thereof. The forward extension 350 projects forwardly from its rear end 354 (adjacent to the illumination circuit board 520) by a distance 352 of approximately 30 millimeters. This allows a low-angle illumination assembly 290 (also described below) to assume an appropriately low angle with respect to an object surface.

The base 210 can also be connected to the overall ID reader body (block 200) via appropriate mechanical and electrical connections. The body can define a handle that includes a power supply 202 (e.g. a rechargeable battery, contacting/inductive charging ports, etc.), trigger assembly 204 and wired/wireless communications circuit(s)/antenna(s) 206.

Figure 5:
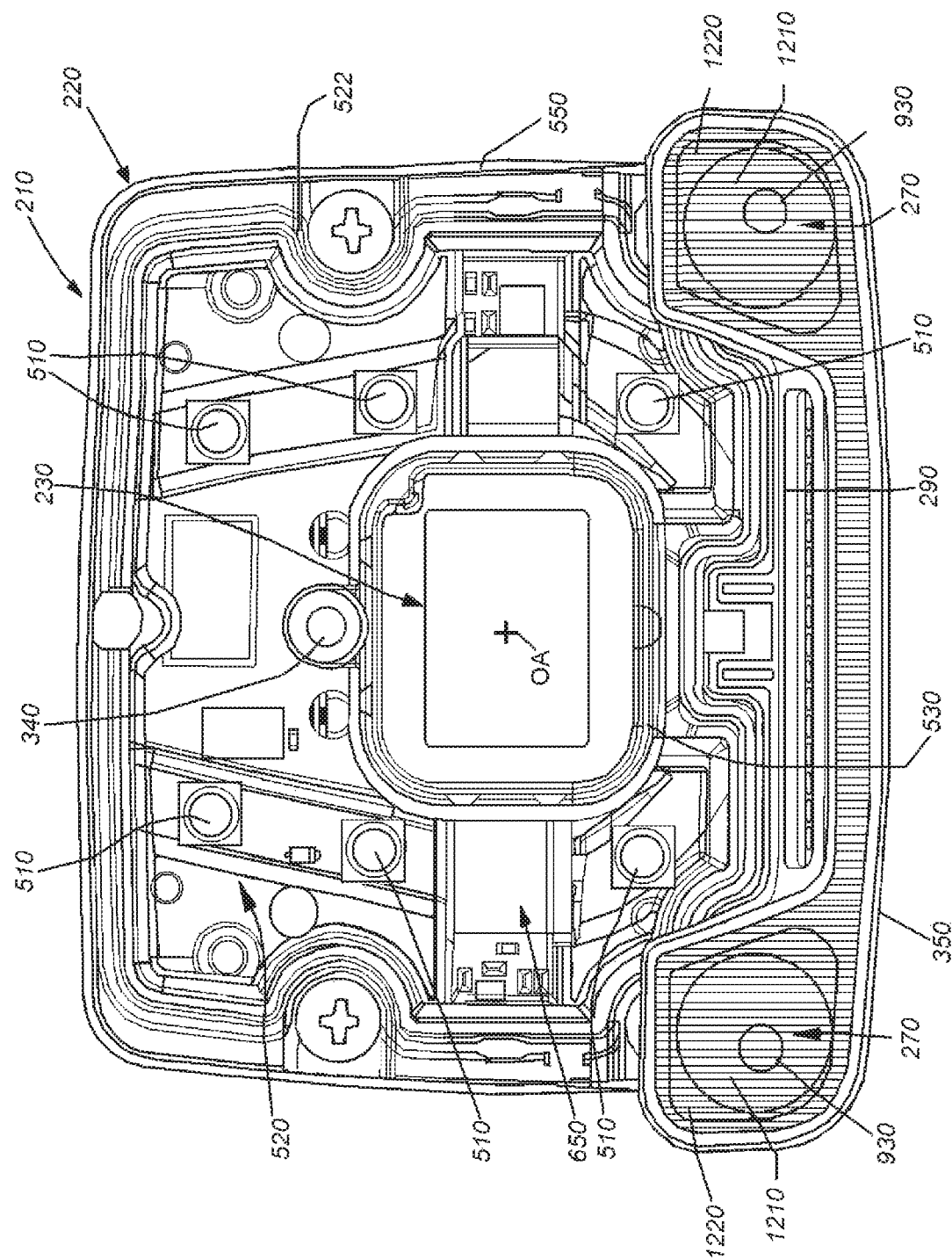
FIG. 5 is an exposed front view of the ID reader module depicted in FIG. 4, showing the illumination circuit board and 45-degree aimer mirror within a chamber formed in the secondary illumination optics.

The received light from an object of interest (e.g. containing one or more ID codes thereon) passes through a central aperture 230 that is rectangular-shaped in this example. The aperture 230 is defined in part by a reflective, concave (or convex) diffuser 250 that provides a front cover for the illumination assembly. More generally, the diffuser 250 is located within the reader head in a location surrounding, and in front of, the image sensor (and associated optics). The diffuser 250 that has an approximately conical (e.g. concave and slightly curved) shape that is substantially free of step changes in that curvature and is also substantially free of variation in a wall thickness thereof. The diffuser 250 can include a frosted or textured surface to diffuse the light passing therethrough from a plurality of spaced-apart, high-output direct-illumination LEDs 510 (or other appropriate light sources) transmitting at a desired wavelength/range (or variable wavelengths/ranges), which can be part of an illumination circuit board 520 (FIG. 5). The diffuser 250 can also serve to redirect stray, reflected light away from the aperture 230. More generally, the diffuser 250 and associated direct/diffuse illumination arrangement serve to project light onto an object of interest within the field of view (FOV) of the optics 320 at a range of relatively high angles—e.g. 0-40 degrees with respect to the optical axis OA. In an embodiment, the diffuser defines an approximately rectangular shape (being somewhat curved along edges and corners) with an outer perimeter dimension of approximately 30 millimeters high by 40 millimeters wide. The dimensions can vary widely based upon the application of the ID reader (size of objects, FOV, etc.), and/or other ergonomic considerations. Note that the diffuser 250 contains two pods 260 on each lower, outer corner, respectively, adjacent to the forward extension 350. The pods 260 are each adapted to contain a respective, tilted polarized light projector 270, which is described in further detail below.

Figure 4:
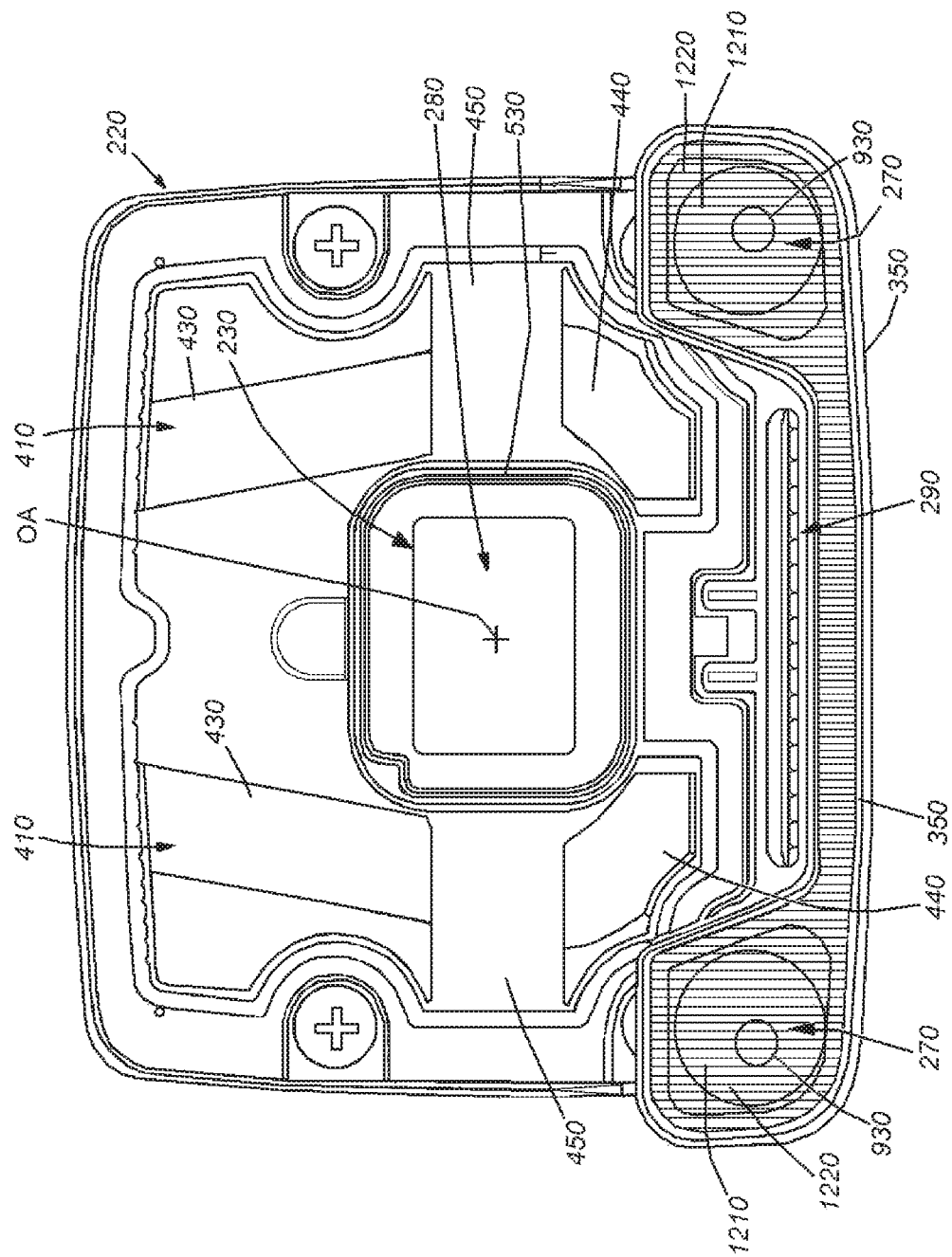
FIG. 4 is a front view of the ID reader module of FIG. 2 with front diffuser removed to reveal the secondary illumination optics.

Notably, the LEDs 510 are covered with a convex (facing forward) semi-cylindrical-shaped secondary optics assembly 410 (FIG. 4) that bends and shapes the light prior through passage of the front diffuser 250, and whence, onto the diffuser 250. This increases the uniformity of the projected light of the (e.g.) six LEDs 510. Note that a greater or lesser number of light sources/LEDs can be used in alternate implementations and/or they can be arranged in alternate geometric configurations about the underlying illumination circuit board. The secondary optics assembly 410 can define a variety of outline shapes, such as linear segments 430 (as shown in FIG. 4) and/or annular segments 840 (as shown in FIG. 8). For example, in the embodiment of FIG. 4, the secondary optics 410 defines a U-shape, with curved lower segments 440 and inwardly-tilted linear upper segments. The outline shape is, in part, defined by the layout of LEDs 510. The secondary illumination optics 410 can constructed from any acceptable transparent or translucent material (e.g. a molded polymer), and is located over the front of the circuit board 520, and held in place by the surrounding assembly and/or using fasteners, adhesives, etc. As described below, a central, horizontal segment 450 of the secondary illumination optics 410 defines a forwardly projecting, rectangular box that provides clearance for the aimer mirror assembly and more generally creates a chamber for light from the LEDs 510 to enter and illuminate the central region of the field of view that is normally darker due to the absence of projected light caused by the presence of the camera optics 320 and associated aperture(s). This arrangement is described further below.

The secondary illumination optics assembly 410 is covered by (or integrates with) an outer, translucent, protective cover 550 that can be constructed from any acceptable material and can include appropriate sealing gasket(s) 522 with respect to the underlying housing. This cover 550 is designed to protect the interior components from dust and moisture so that the reader can be used in harsh environment without risk of damage to its electronics and/or imaging optics. In an embodiment, the reader module 210 can conform with an ingress protection rating of IP65 to IP67 (dustproof and spray-resistant to dust-proof and immersion-resistant). The cover can include light filtering/diffusing surface finish (e.g. frosted/textured), or can be substantially transparent, in whole or in part. The center of the cover 550 includes a separate (integral) or unitary window/area 280 that is transparent, thereby allowing light returned from a viewed object to pass through the overall aperture 230. The window 280 can be part of a polarizing filter arrangement. In this exemplary embodiment, the window 280 is substantially rectangular. The window 280 can include appropriate seals or sealed seams 530 about its perimeter as shown and provided as a separate component from the surrounding cover 550.

Figure 3:
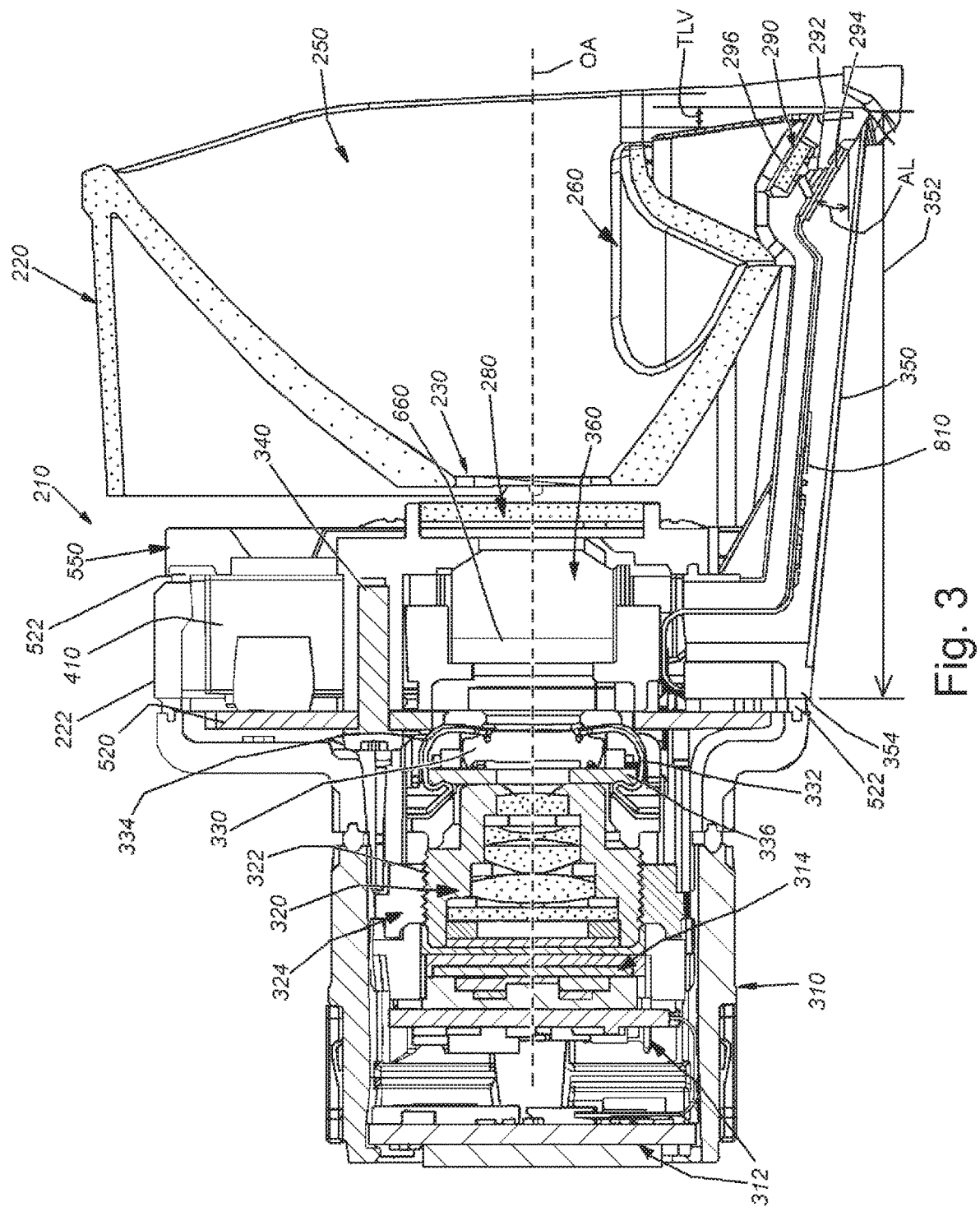
FIG. 3 is a side cross section of the ID reader module taken along line 3-3 of FIG. 2.

Between the two polarizing light pods 260 resides a low-angle light element 290, configured as a strip of (e.g.) sixteen LEDs 292 on an associated, flexible circuit board 294. This strip resides at an angle AL, as shown in FIG. 3, relative to a parallel line of the optical axis OA. The angle AL is between approximately 10 and 25 degrees in an exemplary embodiment. Notably, the LEDs 292 are covered by a window 296 that comprises translucent holographic diffuser with an elliptical shape. Such diffusers are available from a variety of commercial vendors, such as Luminit, LLC of Torrance, Calif. The holographic diffuser uses a microscopic surface geometry to stretch and direct incident light so that a series of discrete beam sources (LEDs 292) appear to define a straight line, and that line can be spread at an angle. The exemplary diffuser window 296 can define an aperture that spreads light 95 degrees along the horizontal (widthwise) axis of the projected LED beam center and 25 degrees along the vertical axis of the beam center. By way of example, the holographic diffuser window 296 is 0.75 millimeter in thickness, 2.83 millimeters wide and 20.28 millimeters in (widthwise) length. In general, the diffuser is arranged so that the diffusivity along one approximate line is greater than the diffusivity along a line perpendicular thereto. An elliptical configuration generally satisfies this parameter. The actual size, number of LEDs, spacing there between, etc. can vary in alternate embodiments. The window 296 is tilted generally at the same angle AL, and parallel with, the LED strip circuit board 294. In an embodiment, the angle AL is approximately 20 degrees. With reference to FIGS. 8 and 9, the LED-carrying flexible circuit board 294 is connected to the main illumination circuit board 520 via a multi-lead flexible circuit board 810, which operates similarly to a very thin ribbon cable in this exemplary embodiment. This cable 810 is soldered or plugged into the illumination circuit board 520 at a location 910 in a lower position on the board 520 so that it can run along the inside face of the forward extension. Note that the board 520 includes a (e.g. round) hole 920 that is aligned generally with the viewing aperture 230 of the system.

With reference to the light ray diagram 1000 of FIG. 10, the LEDs 292 and diffuser 296 generate a horizontal and vertical fan/cone of light 1010 that, along the vertical axis (as shown), generally resides between approximately 18 degrees (angle LA1) and 36 degrees (angle LA2) relative to a line 1020 parallel with the optical axis OA. This translates into a low-angle light projected on a surface 1030 approximately normal to the optical axis OA of between approximately 72 degrees and 54 degrees. As described below the average working distance can be around 30 millimeters for best reading of certain types of ID codes. The line of a plurality of discrete LEDs 292 can project a similar wavelength/range as the LEDs 510 (or other light sources) used in direct/diffuse illumination—for example, red. Note, in an alternate embodiment, the positioning of the low-angle light element/assembly can vary with respect to the ID reader housing. For example, the element can be located along the top of the housing on an appropriate forward extension.

Notably, the use of a forward-positioned LED array with a holographic diffuser provides a more directed and higher output solution than a typical light-pipe based solution, in which the light from a source contained within the reader housing is directed through a forward-extended light pipe to a location that facilitates projection of low-angle light onto the object surface.

Figure 11:
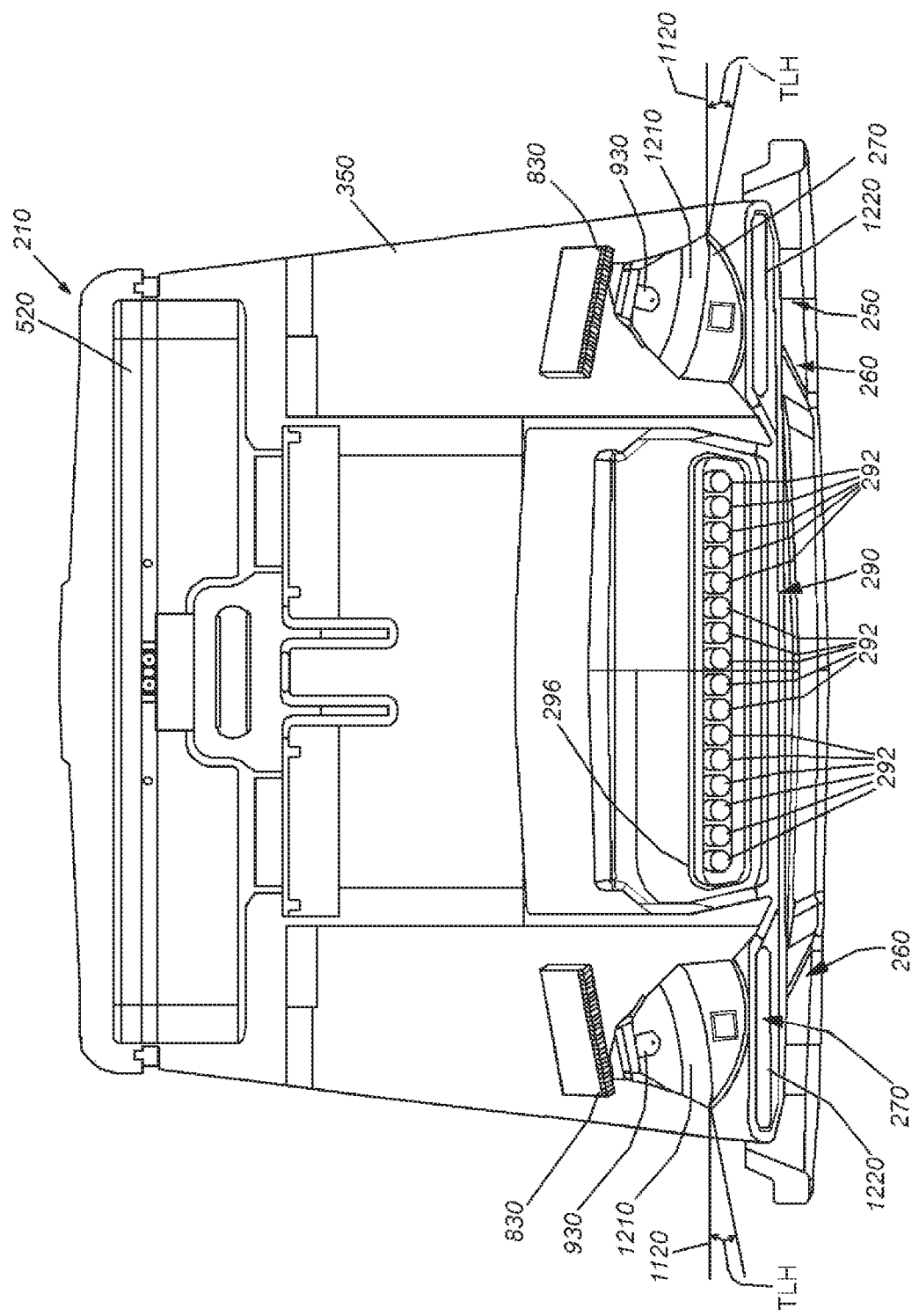
FIG. 11 is a cut-away top view of the ID reader module of FIG. 2 showing the inwardly angled orientation of the polarized illuminators.
Figure 12:
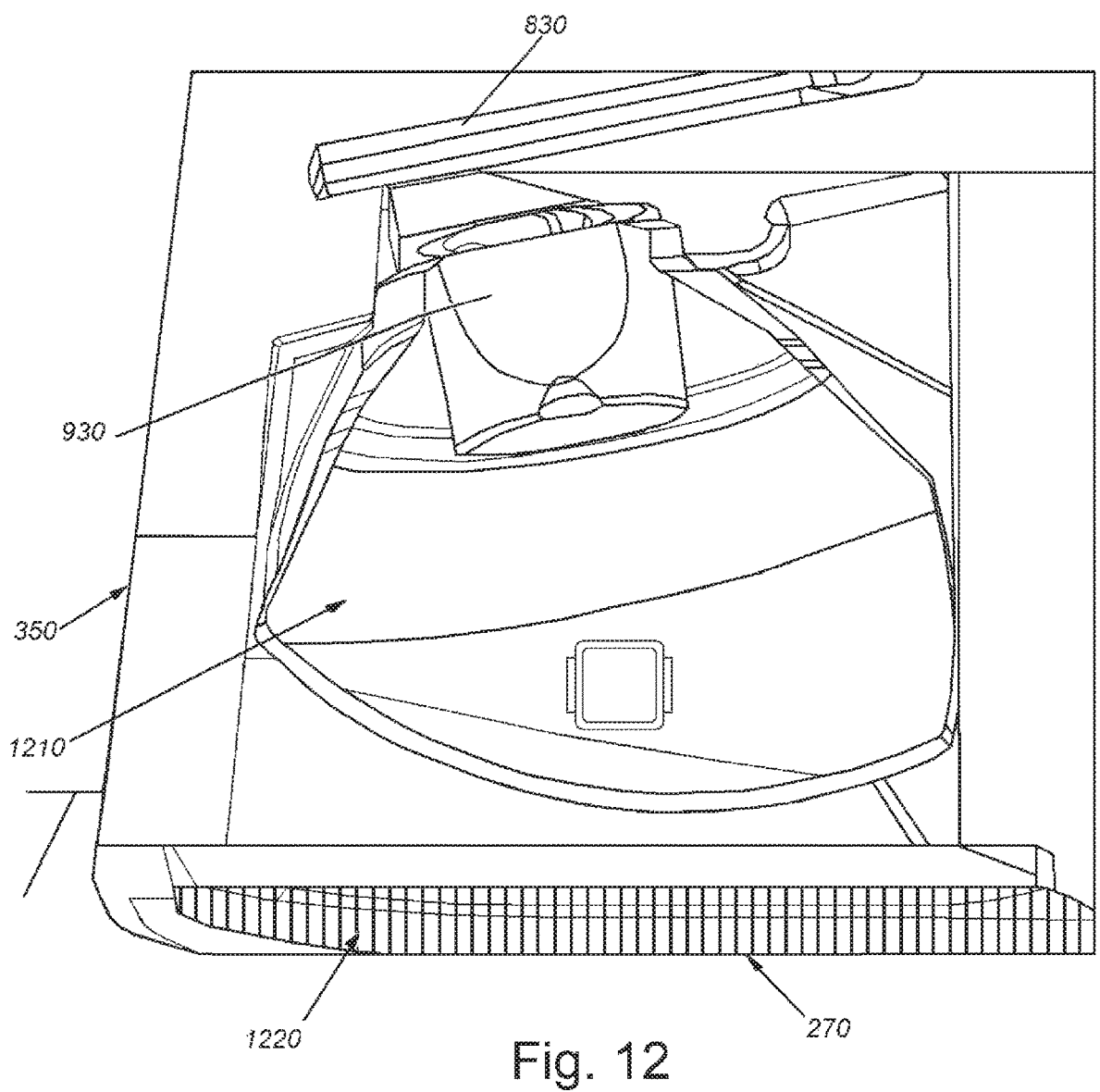
FIG. 12 is a more-detailed top view of the polarized illuminator of FIG. 11.
Figure 13:
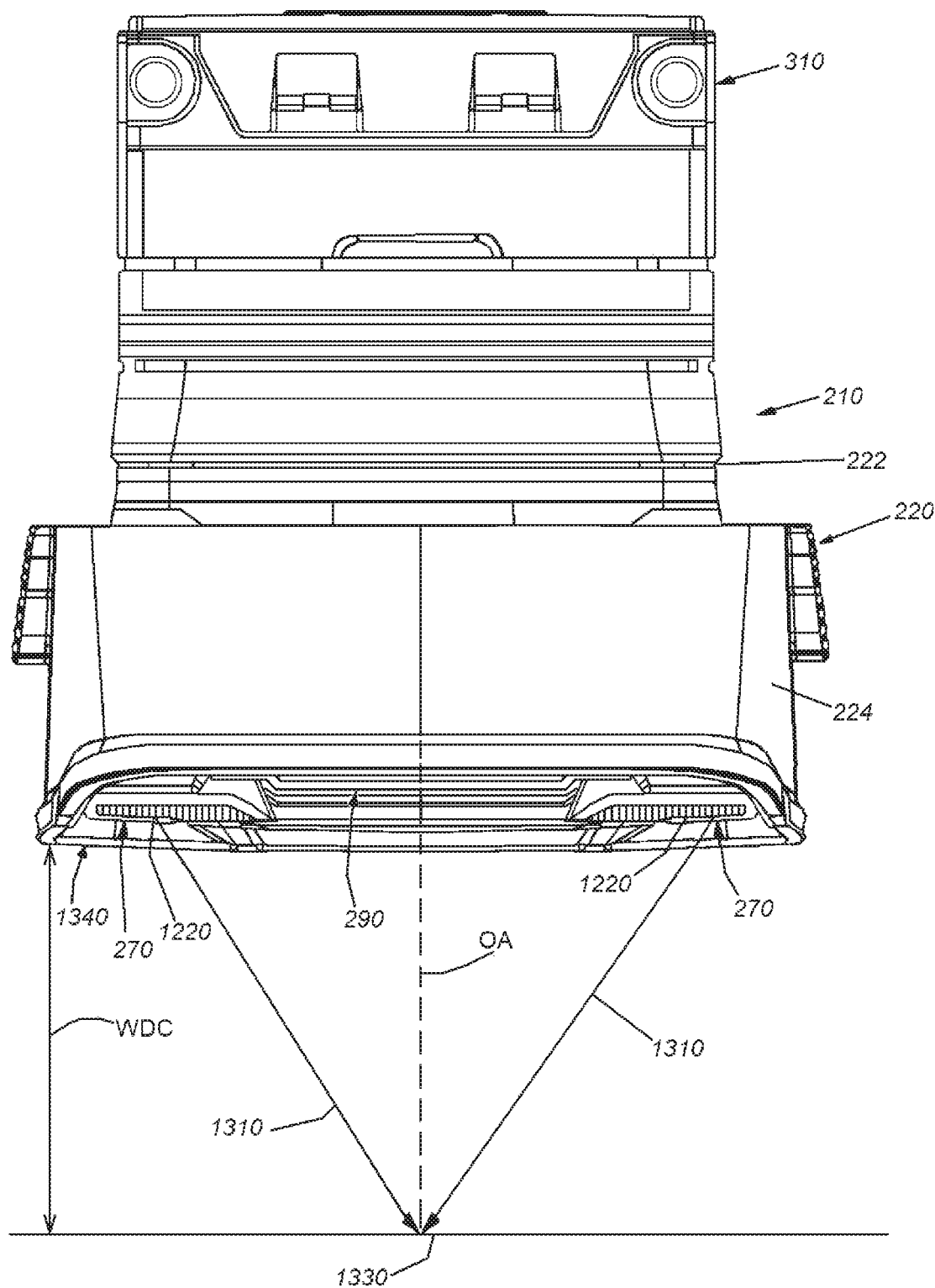
FIG. 13 is a top view of the ID reader module of FIG. 2 showing the point of convergence of the optical axes of each respective polarized light source on the surface of an object.

The flexible circuit board 810 also includes a pair of oppositely directed, horizontal branches 830 that interconnect respective high-output LEDs 930 that can be any wavelength or range of wavelengths—for example, red. The LEDs 930 are mounted with respect to the pods 260 in the front diffuser 250, and are part of the polarized light projector assembly 270. With further reference to FIGS. 11 and 12, each light element 270 includes a lens 1210 located in front of the LED 930. The lens 1210 is covered by an outer window 1220 that can include a polarizing material such that projected light exits the unit 270 as polarized light in (e.g.) a single polarized orientation. As described above, the polarizing lens/filter 1210 of the projector 270 transmits light in a cross-polarized orientation (i.e. generally perpendicular) with respect to the polarizing orientation of the camera optics window 280. Note that each lens/filter in the assembly 270 projects light in a substantially similar polarization direction (which is cross-polarized with respect to the receiving filter at the camera assembly). The LEDs 930, and lenses are tilted inwardly, toward each other at an angle TLH (FIG. 11) with respect to the horizontal axis (line 1120) to direct the light inwardly as shown in FIG. 13. In an exemplary embodiment, the angle TLH is approximately 11 degrees. The beams can also be tilted slightly upwardly (with respect to a vertical axis perpendicular to the page of FIG. 11) by approximately 8 degrees. Hence, the central axis 1310 of each polarized beam is directed to cross at a convergence point 1330 on the reader optical axis OA at a working distance from the reader's front edge 1340 of approximately 30 millimeters. This is located at a desired position for reading a variety of ID code types (e.g. small DPM codes). However, it is expressly contemplated that the reader can decode various ID codes at closer or further distances in operation. Note that the angles employed are specific to the desired location of the convergence point and that a further or closer working distance, and/or a different spacing between polarized light units can dictate a different horizontal and/or vertical tilt angle.

Figure 6:
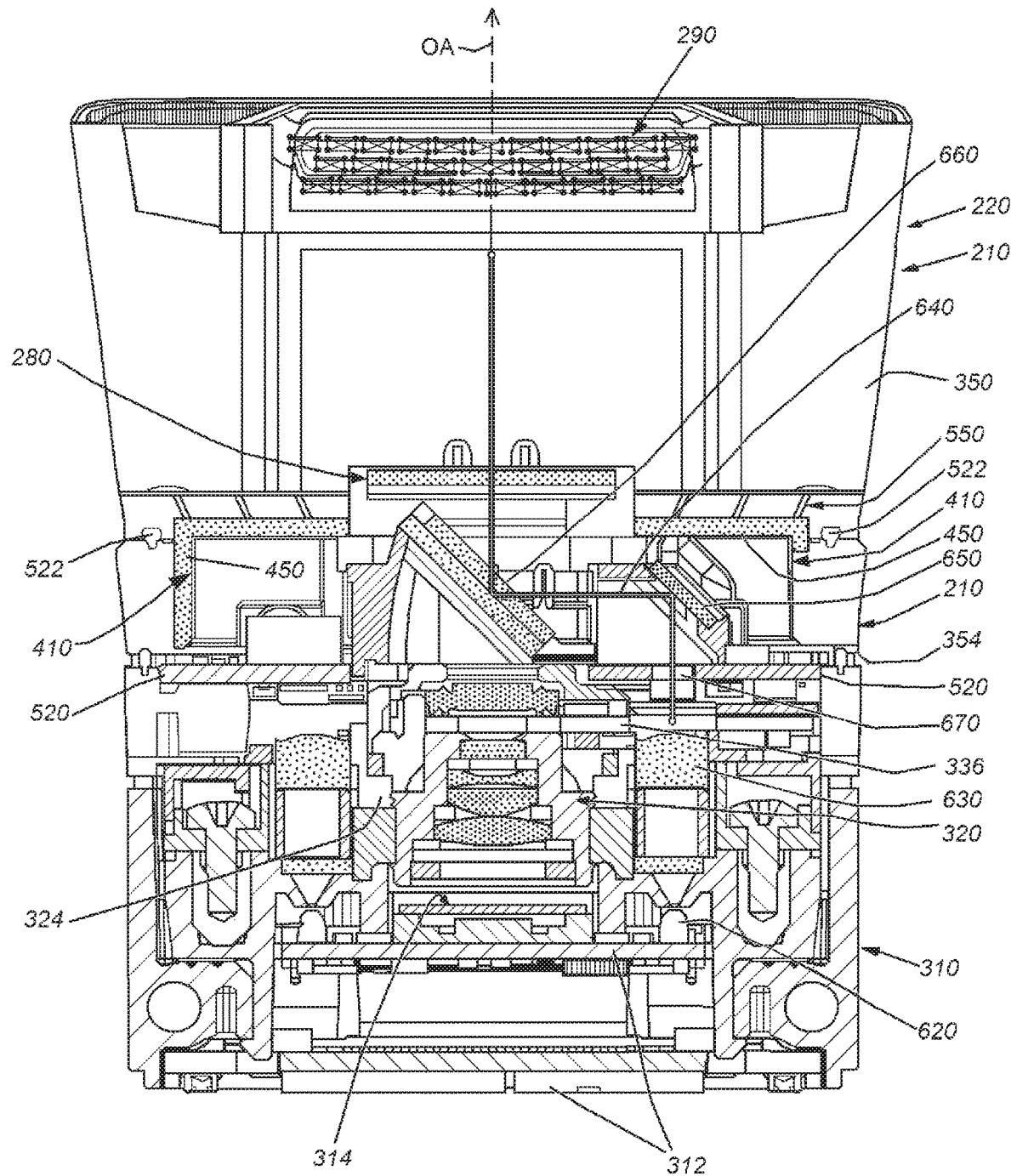
FIG. 6 is a top cross section ID reader module taken along line 6-6 of FIG. 2.
Figure 7:
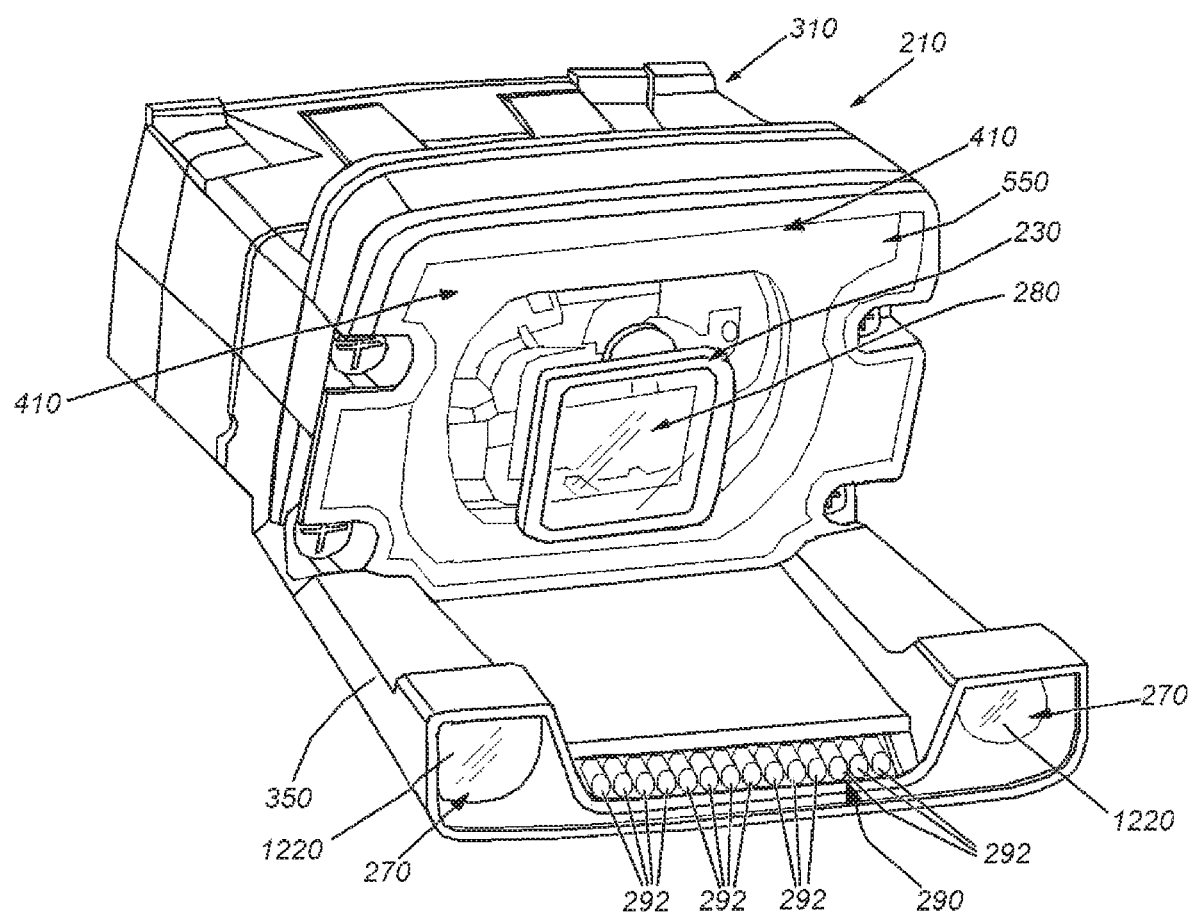
FIG. 7 is an exposed perspective view of an ID reader module according to a modified embodiment showing generally the placement of illumination assemblies relative to the reader module and associated forward extension.

With reference particularly to FIG. 6, the depicted cross section shows an on-axis aimer arrangement that takes advantage of one or more light sources (e.g. LED 620) to direct light through the central window 280 of the reader along the optical axis and onto the object of interest. As shown, the aimer LED 620 is provided on the image sensor circuit board, aside the sensor 314, and in the region of the optical axis' horizontal plane. The LED 620 projects a (e.g.) green-wavelength light through a collimating lens 630 that generates a thin, collimated beam 640. The beam passes through a hole 670 in the illumination circuit board 520, and is then directed onto a 45-degree mirror 650 that resides in the rectangular (box) space 450 formed in the secondary optics 410 relative to the illumination circuit board 520. The beam 640 is directed laterally into a second on-axis dichroic filter/mirror 660, which is also oriented at a 45-degree angle and reflects/redirects the green aimer beam onto the optical axis OA. The dichroic filter 660 is adapted to allow returned illumination light from the object (e.g. red light from high output LEDs 510) to pass along the optical axis back to the image sensor 314, but to reflect/redirect the collimated beam 640 from the aimer LED 620 and lens 630. Since the aimer is green and the illumination is red (or a differing wavelength), the user can clearly differentiate the aimer from other illumination light, and effectively align the system with the ID code to-be-read. In particular, the filter 660 is selected to reflect the wavelength(s) (green) associated with the aimer beam 640, but allow passage of wavelengths associated with the illumination projected by the direct, low-angle and polarized assemblies (red) onto the object.

Notably, the central aperture/hole 230 through which the camera views the object, which passes through the circuit board 520, secondary illumination optics 410, cover 550 and front diffuser 250, has a tendency to create a shadow effect in the projected illumination pattern on the object in prior art designs. The size and light-intensity difference for this shadow effect is influenced by various parameters, including, but not limited to the size/diameter of the hole perimeter, the shape of the hole perimeter, the distance between the illumination board and the image sensor, and/or the focal distance and aperture of the lens assembly. More generally, the term "shadow" or "shadow effect" as used herein shall refer to a condition wherein the acquired image of the scene includes a (generally) central (non-illuminated) portion of the reader's diffuser, which is reflected back to the sensor by a shiny/specular object in the scene. The illustrative embodiment reduces the effect of this shadow effect by defining a chamber (360 in FIG. 3, formed by boxes 450 in the secondary optics) around the dichroic mirror 660 within the secondary optics 410). This chamber 360 allows some stray light from the illumination board 520 to leak, and become projected through the aperture 230, onto the object.

Figure 14:
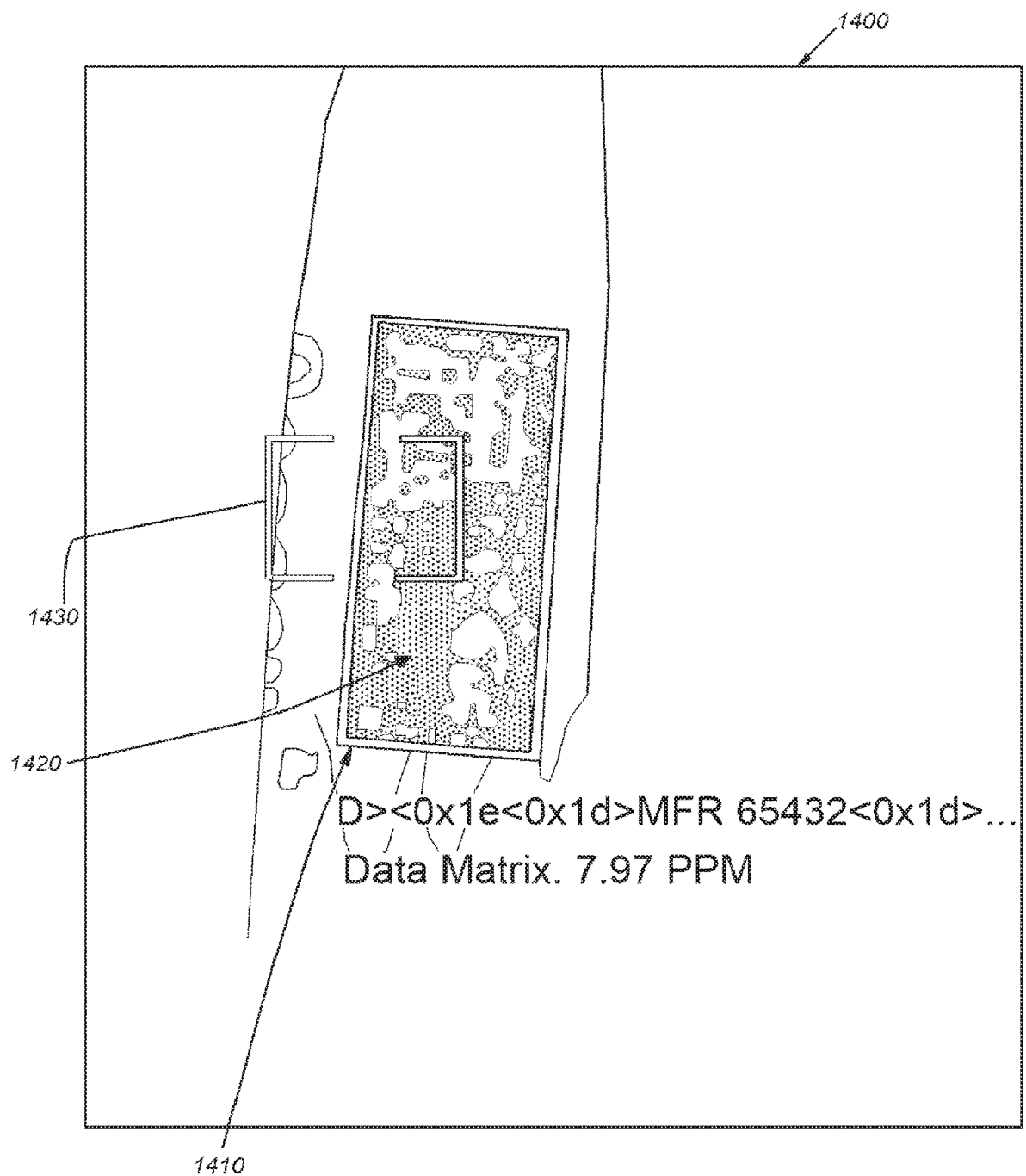
FIG. 14 is an exemplary image of an ID code on a round shaft acquired using a version of an ID reader module that generates an undesirable shadow effect, and other associated effects, which render the ID code less readable.
Figure 15:
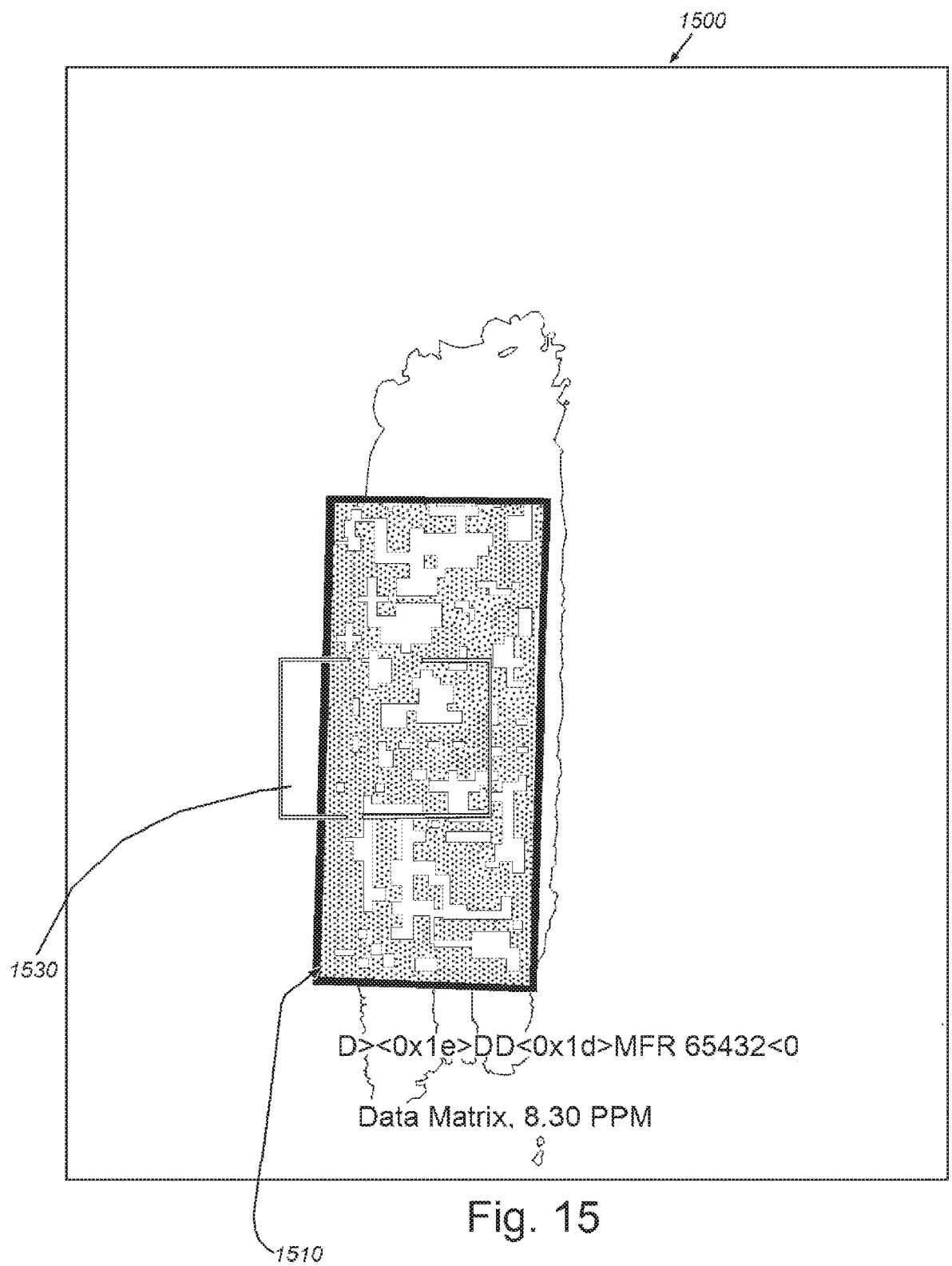
FIG. 15 is an exemplary image of an ID code on a round shaft acquired using the above-described embodiment(s) of the ID reader module which reduce undesirable illumination effects and render the imaged ID code more-readable.

With reference to FIGS. 14 and 15, respective images 1400 and 1500 depict imaged ID codes 1410 and 1510. The code is located on a shaft, where the working focal distance varies with the width of the code (which wraps around the perimeter). As the optimum location of each illumination varies, the use of a variable lens (e.g. liquid lens) allows the system to accommodate differing optimal distances (sweet spots) for each type of illumination. The code 1510 is imaged using an ID reader module configured according to the above-described embodiments(s). The embodiment(s) include an on-axis aimer, as well as a polarized window 280 that is free of certain transparent polymers, such as PMMA. The secondary optics 410 is configured as a frosted or textured diffusive surface. As shown, the ID code 1510 appears more clearly defined in the image 1500, and therefore, more readily decodable. More particularly, in the image 1400 of FIG. 14, a shadow (effect), or darkened area appears in the region 1430 that obscures (region 1420) a portion of the code. Conversely, the region 1530 of the image 1500 (FIG. 15) is largely free of a shadow or darkened effect.

In operation, the user locates the ID reader with respect to the object to be imaged. The user operates the trigger to direct the on-axis aimer to project a beam that is aligned onto the visually observed ID code. The illumination assembly (ies) concurrently illuminate(s) the surrounding region of the field of view. One or more images are acquired of the region and associated ID code. The various illumination types (direct, polarized and low-angle) can be applied together for each acquired image, or in sequence with respect to a series of respective acquired image frames. Acquisition of image frames can occur when illumination is projected onto the object, and the system can indicate via an appropriate indicator (e.g. an audible or visible indicator), when a readable ID code has been decoded. Decoded information is stored and/or transmitted to a remote processing device as described above.

III. ID Reader Assembly with Bright Field Illumination

Figure 16:
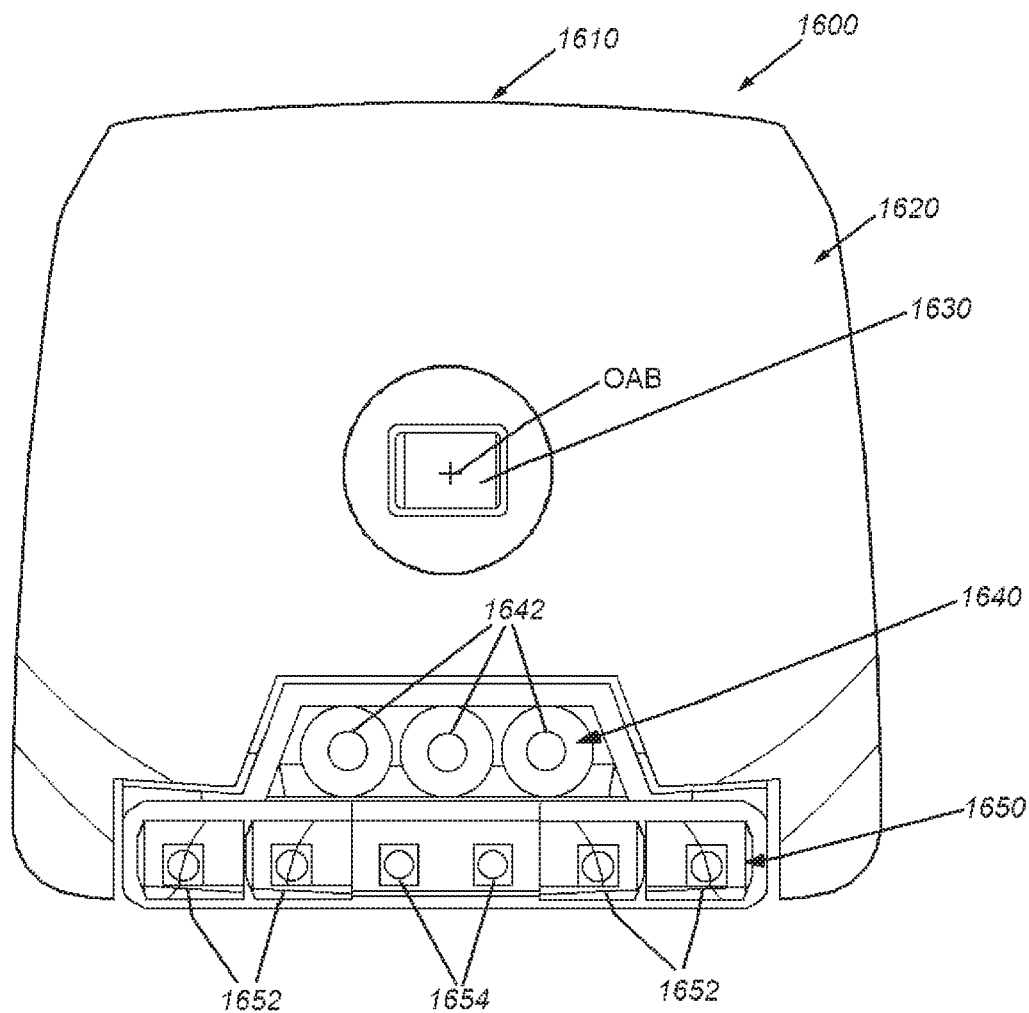
FIG. 16 is a front view of an ID reader module according to another exemplary embodiment, in which the polarized illumination is located more adjacent to the camera optical axis and the low-angle light assembly is combined with a bright field light assembly.

Reference is made to FIG. 16, showing a front view of an ID reader 1600 and an associated imaging and illuminating face 1610. The face 1610 includes a conical/domed, or otherwise convex/concave diffuser 1620 behind which reside a plurality of illumination sources, (e.g. LEDs on an illumination circuit board) and (optional) focusing optics as described generally above. The diffuser surrounds a polarizing window 1630, as also described generally above that is centered with respect to the camera optical axis OAB. The polarized illumination assembly 1642 is located at the lower portion of the reader head 1600, and extended forwardly as described above. However, in the example, it is located closer to the optical axis OAB and is centered in a cluster of three LED and polarizing lens units 1642. The polarized illumination assembly 1640 is located above the low-angle light assembly 1650.

The low-angle illumination assembly 1650 consists of a plurality (e.g. six) LEDs 1652 and 1654 that can be arranged on a flexible circuit as described above, and are located at the bottom of the reader head 1600 in a forward position as also described above. The assembly 1650 extends a majority of the width of the reader head. Notably, the LEDs of the low-angle illumination assembly 1650 are arranged to generate a bright-field pattern. Hence, this bright field illumination consists of a line of LEDs, wherein a first group of LEDs 1654 (the two central elements) is located in the middle of the line, and a second group of LEDs 1652 (two elements on either side) is located at each opposing end at both ends of this line. To generate the desired effect, the first, central group of LEDs 1654 projects the light at a shorter distance on (intersecting with) the camera optical axis OAB than the second group 1652 intersect the camera optical axis OAB. All LEDs are arranged to project and intersect the camera optical axis OAB at an angle within a range as described generally above to provide the desired low-angle effect. The projection distance can be based upon a desired reading distance and determined (in part) by trial and error to obtain an optimal illumination at that distance. Additionally, it is contemplated the low-angle/bright field illumination assembly can be covered in whole or in part with a holographic diffuser of a type described above.

The exemplary arrangement of polarized and low-angle/bright-field illumination further optimizes reading of a variety of code types, which can also include label-based codes located on parts/objects. Such label-based codes are more beneficially illuminated with a bright-field lighting component, while DPM-style codes are more beneficially illuminated with the low-angle component. In general, the illumination wavelengths for each discrete assembly (diffuse, polarized and low-angle/bright-field) can be similarly differentiated as that described in detail above.

IV. Conclusion

The above-described ID reader assembly provides a highly effective combination of illumination types that work effectively within a working range useful for reading DPM and similar codes on (e.g.) variable and/or rounded surfaces. The ID reader's relatively compact (generally handheld) size and robust performance is facilitated by a combination of direct-polarized and on-axis aiming illumination with a variable (e.g. liquid) lens, a unique configuration mirrors, circuit boards, secondary illumination optics and associated space to allow surrounding illumination light to fill the central shadow effect.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, while the depicted reader module is shown in association with a handheld reader, it can be adapted to operate in a variety of arrangements including a fixed mount reader housing. Additionally, while a flexible printed circuit, can be employed for the forward illuminators, another form of interconnection (e.g. conventional wire leads, ribbon cables, etc.) can be used in alternate implementations. Also, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. An system for capturing images from one or more ID codes directly marked onto an object comprising:
   a module having,
   (a) an image sensor assembly that transmits data relative to the images to a vision system processor,
   (b) a diffuse illumination assembly,
   (c) a low-angle illumination assembly mounted adjacent to a front end of a forward extension that extends forwardly beyond light sources of the diffuse illumination assembly, and
   (d) a polarized illumination assembly; and
   a polarizing filter mounted between the object and the image sensor assembly in which a polarization direction of the filter is approximately perpendicular to a polarization direction of the illumination.

2. The system as in claim 1, wherein the low-angle illumination assembly defines a plurality of discrete light sources arranged approximately in a line, and further comprises a holographic diffuser between the light sources and the object, wherein the holographic diffuser defines diffusivity approximately along a line greater than diffusivity perpendicular to a line.

3. The system as set forth in claim 2 wherein the plurality of discrete light sources comprises a plurality of LEDs.

4. The system as set forth in claim 3 wherein some of the plurality of LEDs define a first crossing point with an optical axis of the image sensor assembly and other of the plurality of LEDs define a second, spaced-apart, crossing point with the optical axis so as to generate a bright-field effect.

5. The system as set forth in claim 4 wherein the plurality of LEDs are arranged on a line along a widthwise direction of the module on a bottom side thereof and a first group of LEDs, that are more adjacent to the optical axis, define the first crossing point more adjacent to the module, and a second group of LEDs, that are less adjacent to the optical axis than the first group, define the second crossing point that is less adjacent to the module.

6. The system as set forth in claim 1 wherein the polarized illumination assembly comprises at least two light sources, the light sources projecting polarized light in a substantially similar polarization direction, located on each of opposing sides of the low-angle illumination assembly.

7. The system as set forth in claim 4 wherein the at least two light sources comprise at least two LEDs, and further comprising, a respective polarizing filter located in front of each of the at least two LEDs.

8. The system as set forth in claim 7, further comprising a lens assembly associated with the respective polarizing filter constructed and arranged with a tilt so that polarized light from the at least two LEDs is directed to cross an optical axis of the image sensor assembly approximately at a predetermined working distance.

9. The system as set forth in claim 1 wherein the diffuse illumination assembly defines a plurality of light sources on an illumination circuit board located behind a diffuser that surrounds optics of the image sensor assembly.

10. The system as set forth in claim 9, further comprising beam-shaping optics that spread light projected by the light sources on the illumination circuit board and wherein the beam-shaping optics confront a protective, light-transmitting cover that seals an interior of a housing of the module.

11. The system as set forth in claim 10 wherein the beam-shaping optics are constructed and arranged to allow light to enter a central region of the diffuser so as to reduce a shadow effect.

12. The system as set forth in claim 11 wherein the protective cover has a window located in front of the image sensor assembly along an optical axis thereof that carries the polarizing filter.

13. The system as set forth in claim 10 wherein the optics of the image sensor assembly has a liquid lens that adjusts a focus distance of the image sensor assembly.

14. The system as set forth in claim 13 further comprising control circuitry that adjusts the focus distance based upon one or more types of illumination (b), (c) and (d) being projected by the module.

15. The system as set forth in claim 14 wherein the focus distance associated the illumination (b) is located more adjacent to the image sensor and the focus distance associated with the illuminations (c) and (d) is at a further spacing from the image sensor.

16. The system as set forth in claim 15 wherein the further spacing is approximately 30 millimeters with respect to illumination (b).

17. The system as set forth in claim 10, further comprising an aimer assembly that projects an aimer beam from a light source located behind the illumination circuit board onto a mirror assembly that redirects the aimer beam onto an optical axis of the image sensor assembly.

18. The system as set forth in claim 17 wherein the aimer beam is projected through a collimating lens and the mirror assembly has a redirecting mirror that receives the aimer beam from the collimating lens and a dichroic mirror arranged on the optical axis that receives the aimer beam from the redirecting mirror, and reflects the aimer beam onto the optical axis.

19. The system as set forth in claim 18 wherein the diffuse illumination defines a first wavelength range that passes through the dichroic mirror and the aimer beam defines a second wavelength range that is reflected by the dichroic mirror.

20. The system as set forth in claim 18 wherein a wavelength range of the illuminations (b), (c) and (d) differ from the wavelength range of the aimer beam, and wherein the dichroic mirror reflects the wavelength of the aimer beam and transmits the wavelength of each of the different illumination.

21. The system as set forth in claim 1 wherein the module is mounted on a handheld ID reader housing.

22. The system as set forth in claim 1 wherein the light sources of the illuminations (c) and (d) are mounted on a flexible printed circuit board, and wherein the flexible printed circuit board is connected with a rigid printed circuit board on which the light sources of the illumination (b) are mounted.

23. A method for capturing images from one or more ID codes directly marked onto an object, comprising the steps of:
 (a) providing an image sensor assembly and transmitting data relative to the images to a vision system processor,
 (b) projecting light from a diffuse illumination assembly onto the object,
 (c) projecting light from a low-angle illumination assembly onto the object,
 (d) projecting light from a polarized illumination assembly onto the object; and
 (e) providing a polarizing filter mounted between the object and the image sensor assembly in which a polarization direction of the filter is approximately perpendicular to a polarization direction of the illumination.

24. A system for capturing images from one or more ID codes directly marked onto an object comprising:
 a module having,
 (a) an image sensor assembly that transmits data relative to the images to a vision system processor,
 (b) a diffuse illumination assembly,
 (c) a low-angle illumination assembly, and
 (d) a polarized illumination assembly; and
 a polarizing filter mounted between the object and the image sensor assembly in which a polarization direction of the filter is approximately perpendicular to a polarization direction of the illumination,
 wherein at least one of the low angle illumination assembly or the polarizing illumination assembly are mounted adjacent to a front end of a forward extension that extends forwardly beyond light sources of the diffuse illumination assembly.

25. An system for capturing images from one or more ID codes directly marked onto an object comprising:
 a module having,
 (a) an image sensor assembly that transmits data relative to the images to a vision system processor,
 (b) a diffuse illumination assembly,
 (c) a low-angle illumination assembly, and
 (d) a polarized illumination assembly; and
 a polarizing filter mounted between the object and the image sensor assembly in which a polarization direction of the filter is approximately perpendicular to a polarization direction of the illumination,
 wherein light sources of the illumination (b) are located behind a translucent diffuser, the diffuser being located surrounding, and in front of, the image sensor, and the diffuser defining an approximately conical shape that is substantially free of step changes in a curvature thereof and substantially free of variation in a wall thickness along the approximately conical shape thereof.

* * * * *